(12) United States Patent
Johnson

(10) Patent No.: US 9,418,791 B1
(45) Date of Patent: Aug. 16, 2016

(54) FOLDED STACK SEGMENTED FILM CAPACITOR

(71) Applicant: Neldon P. Johnson, Deseret, UT (US)

(72) Inventor: Neldon P. Johnson, Deseret, UT (US)

(73) Assignee: Black Night Enterprises, Inc., Charleston (KN)

( * ) Notice: Subject to any disclaimer, the term of this patent is extended or adjusted under 35 U.S.C. 154(b) by 174 days.

(21) Appl. No.: 14/517,797

(22) Filed: Oct. 17, 2014

(51) Int. Cl.
*H01G 4/26* (2006.01)
*H01G 2/16* (2006.01)
*H01G 4/30* (2006.01)

(52) U.S. Cl.
CPC . *H01G 4/26* (2013.01); *H01G 2/16* (2013.01); *H01G 4/30* (2013.01)

(58) Field of Classification Search
CPC .............. H01G 2/16; H01G 4/26; H01G 4/18
See application file for complete search history.

(56) References Cited

U.S. PATENT DOCUMENTS

| | | | | |
|---|---|---|---|---|
| 4,089,037 A | * | 5/1978 | Rayburn | H01G 4/26 361/304 |
| 4,146,914 A | * | 3/1979 | Rayburn | H01G 4/26 361/304 |
| 4,494,168 A | | 1/1985 | Kume et al. | |
| 4,694,377 A | | 9/1987 | MacDougall et al. | |
| 5,717,563 A | | 2/1998 | MacDougall et al. | |
| 5,933,947 A | | 8/1999 | Minamizawa et al. | |
| 5,953,202 A | | 9/1999 | Walters et al. | |
| 6,452,776 B1 | * | 9/2002 | Chakravorty | H01L 21/76894 257/520 |
| 7,812,678 B2 | | 10/2010 | Moussavi | |
| 2006/0050467 A1 | * | 3/2006 | Shiota | H01G 2/16 361/303 |

* cited by examiner

*Primary Examiner* — David M Sinclair
(74) *Attorney, Agent, or Firm* — J. David Nelson

(57) ABSTRACT

A folded stack, segmented capacitor having a continuous capacitor base element which is folded two or more times, in one or more first stack folds and one or more second stack folds, to form three or more stack layers. Each of the stack layers has a primary electrode, which may be a continuous metallic film, and a segmented secondary electrode comprised of a plurality of secondary electrode elements electrically connected to a conductor element by a fuse element. The primary electrode is separated from the segmented secondary electrode and the plurality of secondary electrode elements by a continuous primary dielectric element. The secondary electrode elements are separated from the conductor element by a conductor insulation layer. The fuse elements pass through the conductor insulation layer from the secondary electrode elements to the conductor element.

9 Claims, 10 Drawing Sheets

FOLDED STACK SEGMENTED FILM CAPACITOR

BACKGROUND OF THE INVENTION

The present invention relates to segmented film capacitors and more particularly to stack type film capacitors having segmented film electrodes.

Metalized film capacitors are typically roll type or stack type capacitors. For a typical roll type, each of two strips of dielectric film, a first dielectric strip and a second dielectric strip, have respective metalized electrodes deposited on an electrode side of the dielectric strip. The first metalized electrode deposited on the first dielectric strip extends to one edge, a first metalized edge, of the first dielectric strip, and a strip of unmetalized dielectric is left on the opposing side of the first dielectric strip. Correspondingly, the second metalized electrode deposited on the second dielectric strip extends to the opposite edge, a second metalized edge, and the second dielectric strip has a strip of dielectric film on the opposing side which does not have metalized film. The two dielectric strips with metalized electrodes are wound together forming a capacitor roll, the metalized electrodes being separated by the dielectric film. Each dielectric film strip thus has a marginal non-metalized area extending along one edge, a non-metalized edge, which is matched to the metalized marginal area and metalized edge of the other dielectric film strip. On one end face of the capacitor roll, the first end face, a first end conductor of electrically conductive material is electrically connected to the first metalized edge, and on the opposing end face, the second end face, a second end conductor of electrically conductive material is electrically connected to the second metalized edge. Hence, the first end conductor is connected to the first electrode and the second end conductor is connected to the second electrode.

For a stacked type film capacitor, a plurality of dielectric film strips with metalized electrodes, each dielectric film strip having a non-metalized marginal area, are stacked one on the other so that each dielectric layer is sandwiched between metalized electrodes, and metalized edges and non-metalized edges are alternated from electrode to electrode, or in pairs of electrode with polarity being switched for successive electrode pairs. An end conductor of electrically conductive material may be electrically connected to the respective metalized edges to establish electrical connection and induce polarity.

Commercialization and use of the roll type film capacitor has exceeded that for the stack type primarily due to the advantage the roll type capacitor has in manufacturing. However, it has a disadvantage in that the continuous nature of the electrodes provides that a fault in the dielectric film that separates the electrodes, results in damage spreading in the capacitor and to the failure of the capacitor. Accordingly, a roll type capacitor requires segmentation of the metalized electrodes with current fuse interconnection. Segmentation provides that a fault in the dielectric in one particular area will not result in gross failure of the capacitor.

A typical stack type film capacitor, due to the isolation of the conductive layers, does not suffer from a risk of a fault developing in one dielectric area spreading to the entire capacitor. In other words, a failure or a fault developing in a dielectric for one layer of the stack will damage that layer but will not result in damage spreading to other layers of the stack. However, the manufacturing difficulties in manufacturing a stack film capacitor has resulted in its disfavor in comparison to a roll type capacitor, especially roll type capacitors with various types of electrode segmentation.

Developing technology has led to the development of lighter, thinner, and higher conductivity materials for conductive components of capacitors. One such material is graphene. It is a high conductivity, highly mechanically flexible, thin, and light material than can be used as a preferred material for all of the conductive components of a capacitor, including the metalized film. For all purposes of this application, the term "metalized" film, shall be defined to include dielectric film upon which graphene or other non-traditional conductive materials are disposed.

It is an object of the present invention to provide a folded stack type metalized film capacitor which provides for the utilization of manufacturing techniques which are similar to the manufacturing technique of a roll type capacitor.

It is a further object of the present invention to provide a folded stack type metalized film capacitor which incorporates a continuous base element which may be manufactured by manufacturing techniques which are similar to the manufacturing techniques of a roll type capacitor.

It is a still further objective of the present invention to provide a folded stack type metalized film capacitor which incorporates a thin, flexible ceramic material layer for the dielectric, thereby providing for a substantial increase in the voltage that may be applied to the capacitor, and, hence, a substantial increase in the charge and the energy that may be stored in the capacitor, in comparison to other stack type capacitors and roll type capacitors.

SUMMARY OF THE INVENTION

The folded stack, segmented capacitor of the present invention has a continuous capacitor base element which is folded two or more times, in one or more first stack folds and one or more second stack folds, to form three or more stack layers. Each first stack fold results in the primary surface of a first stack layer being placed in contact, in a primary surface contact zone, with the primary surface of a second stack layer. Similarly, each second stack fold results in the secondary surface of a second stack layer being placed in contact, in a secondary surface contact zone, with the secondary surface of a first stack layer.

Each of the stack layers is comprised of a primary electrode, which may be a continuous metallic film, and a segmented secondary electrode comprised of a plurality of secondary electrode elements, each of the secondary electrode elements being electrically connected to a conductor element by a fuse element. The primary electrode is separated from the segmented secondary electrode and the plurality of secondary electrode elements by a continuous primary dielectric element. The secondary electrode elements are separated from the conductor element by a conductor insulation layer. The fuse elements pass through the conductor insulation layer from the secondary electrode elements to the conductor element. The conductor insulation layer may be comprised of the same dielectric material used for the primary dielectric element, or may be another type of electrically insulating material. Similarly, the secondary electrode insulation between the segmented secondary electrode elements may be the same dielectric material used for the primary dielectric element or may be another type of insulating material.

The material preferred by the present inventor for the primary dielectric element 49, and perhaps the insulating layer and the secondary electrode insulation is a flexible, ultra-thin ceramic material. The use of a flexible ceramic material for the dielectric provides for substantial increase in the maximum voltage and the maximum stored charge for the capacitor of the present invention in comparison to metalized film capacitors.

If a dielectric fault, such as a crack or other type of fissure, develops in a portion of the primary dielectric element material allowing charge leakage as a fault current to flow between a primary electrode and a secondary segmented electrode, the result will be an excess fuse current in the fuse element for the affected secondary electrode element, resulting in the destruction of the fuse element. The result of the destruction of the fuse element by the excess fuse current is that charge leakage as fault current between the primary electrode and the secondary segmented electrode is terminated and the folded stack capacitor continues to operate with only a loss of the affected secondary segmented electrode element or elements. The overall failure of the capacitor is avoided.

For a preferred embodiment, there is an exterior capacitor insulation layer but no insulation coating otherwise on the primary surface of the primary electrode, or on the secondary surface of the conductor element, each first stack fold causes the primary electrode to be folded upon itself, which results in the primary electrode of contiguous stack layers to be in physical and electrical contact in a primary surface contact zone. Similarly, each second stack fold causes the conductor element to be folded upon itself, which results in the conductor element of contiguous stack layers to be in physical and electrical contact in a secondary surface contact zone. The inter-layer electrical contact of the primary electrode and the inter-layer electrical contact of the conductor element may enhance the normal operation of the folded stack capacitor, by, for example, reducing current density at contact points with the first end conductor and the second end conductor respectively.

Materials are selected for the primary electrode, the secondary electrode elements, the fuse elements, the conductor element, the primary dielectric element, the conductor insulation layer, and the secondary electrode insulation, that have adequate flexibility to allow the folding of the capacitor base element without separation and breakage of the various elements. Because the primary electrode is continuous, i.e. is not segmented, any relative electrode displacement of a secondary electrode element with respect to the primary electrode, resulting from the folding of the capacitor base element will not affect the function of the secondary electrode element. Graphene, which is a high conductivity, highly flexible, thin, and light material may be used as a preferred material for one or more of the conductive components, including particularly the primary electrode, the secondary electrode elements, and the conductor element.

The primary electrode may be deposited on or bonded to the primary dielectric element and the secondary electrode elements may be deposited on or otherwise bonded to the conductor insulation layer. To facilitate folding of the capacitor base element, the secondary electrode elements may preferably not be bonded to the primary dielectric element, which may allow relative electrode displacement as slippage between the secondary electrode elements and the primary dielectric element during folding.

DETAILED DESCRIPTION OF PREFERRED EMBODIMENTS

Figure 1:
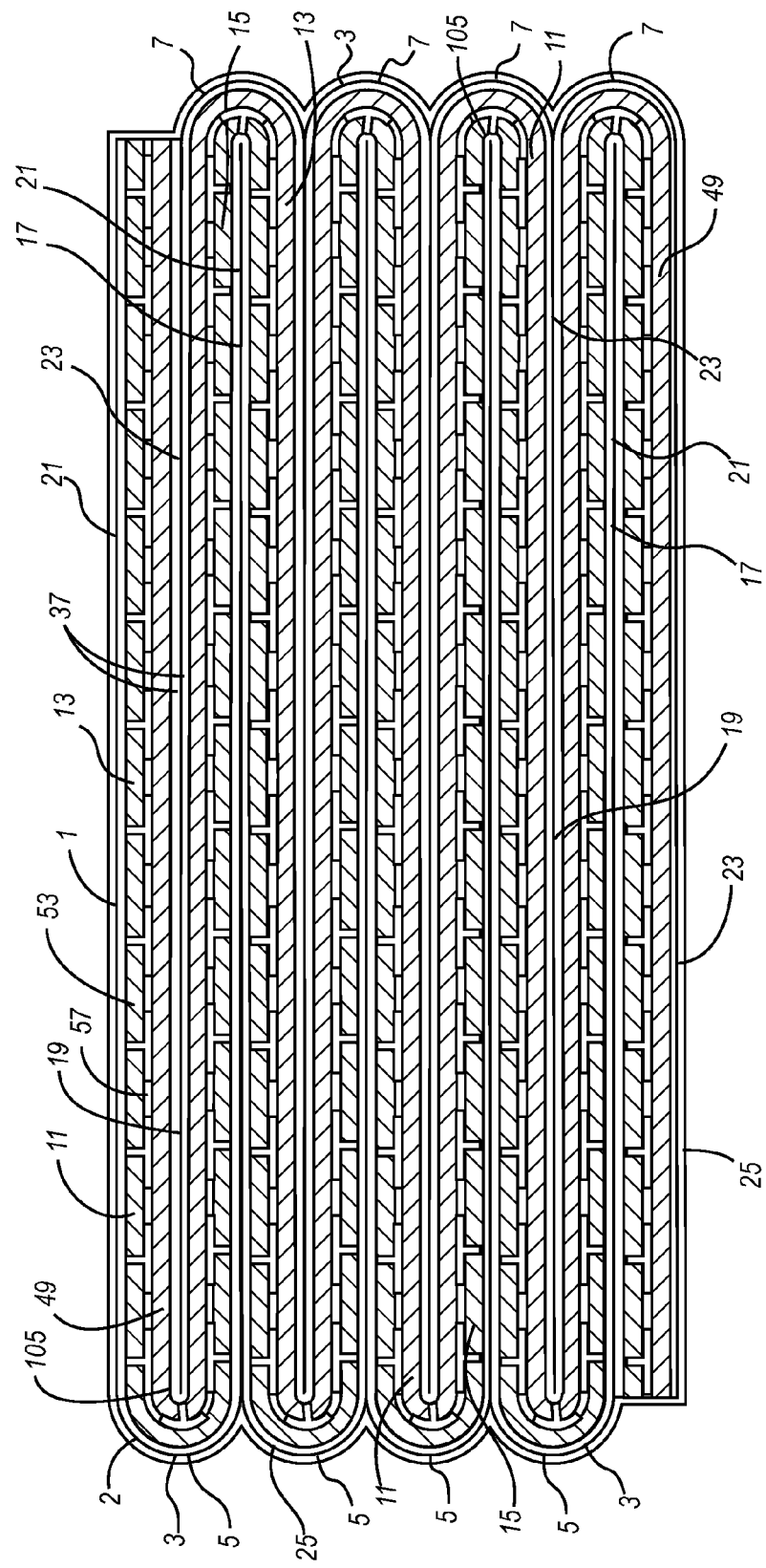
FIG. 1 is a longitudinal cross section of a preferred embodiment of a folded stack, segmented capacitor of the present invention having nine stack layers and eight stack folds.
Figure 2:
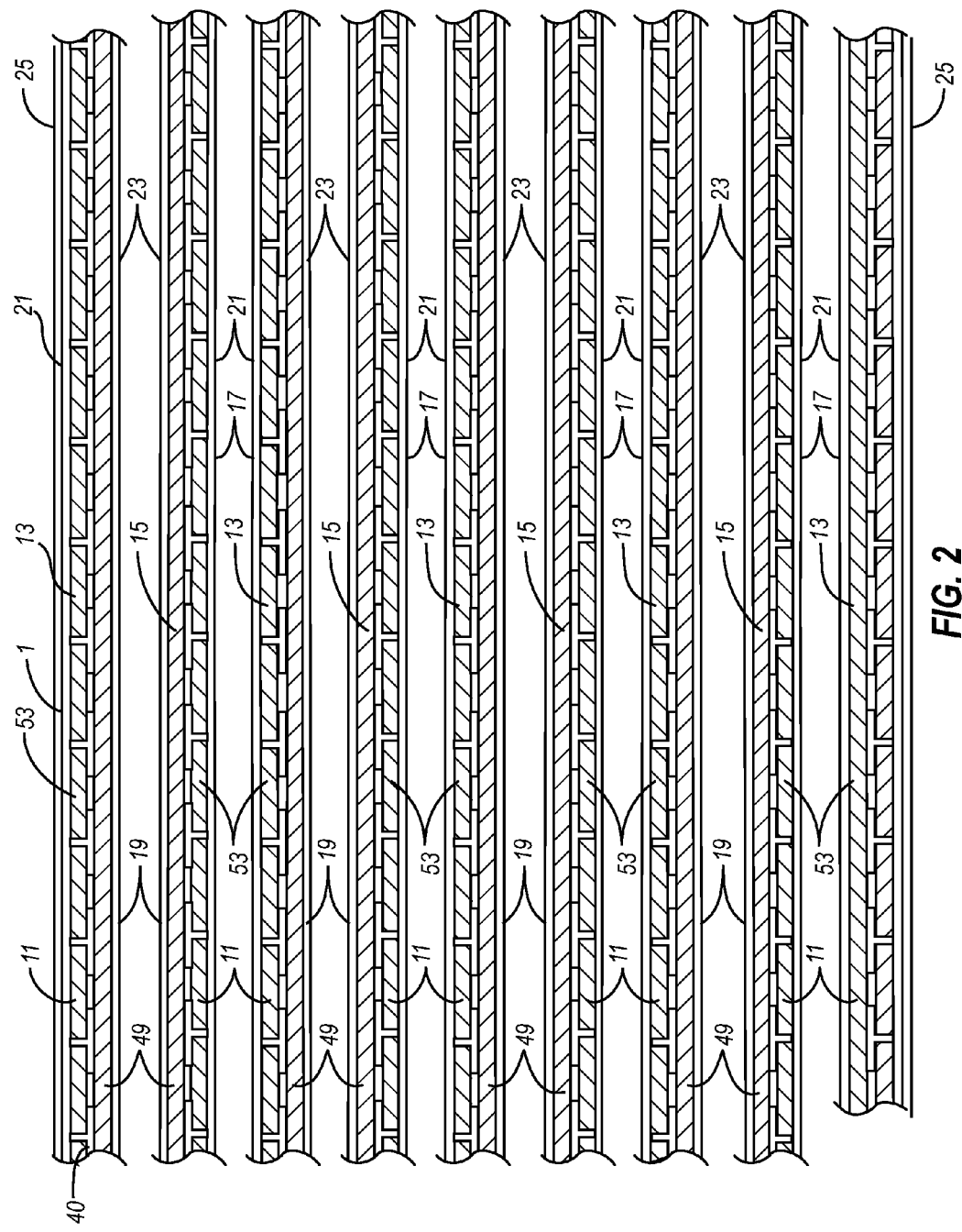
FIG. 2 is a cut away, exploded view, longitudinal cross section of a preferred embodiment of a folded stack, segmented capacitor of the present invention having nine stack layers and eight stack folds.

Referring first to FIG. 1, a cross section of a preferred embodiment of a folded stack, segmented capacitor 1 of the present invention is shown. It should be noted that, for the illustration of the preferred embodiment shown in FIG. 1, the folded stack, segmented capacitor 1 has a continuous capacitor base element 2 which has been folded in eight stack folds 3, which include four first stack folds 5, and four second stack folds 7. As a result of the eight stack folds 3, the folded stack, segmented capacitor 1 that is the embodiment of the folded stack, segmented capacitor 1 shown in FIG. 1, has nine stack layers 11, including five first stack layers 13 and four second stack layers 15. Referring also to FIG. 2, a cut away cross section of the preferred embodiment of the folded stack, segmented capacitor 1 illustrated in FIG. 1 is shown. In FIG. 2, the eight stack layers 11, namely the first stack layers 13 and the second stack layers 15 are shown spaced apart in an exploded view for illustrative purposes.

Figure 3:
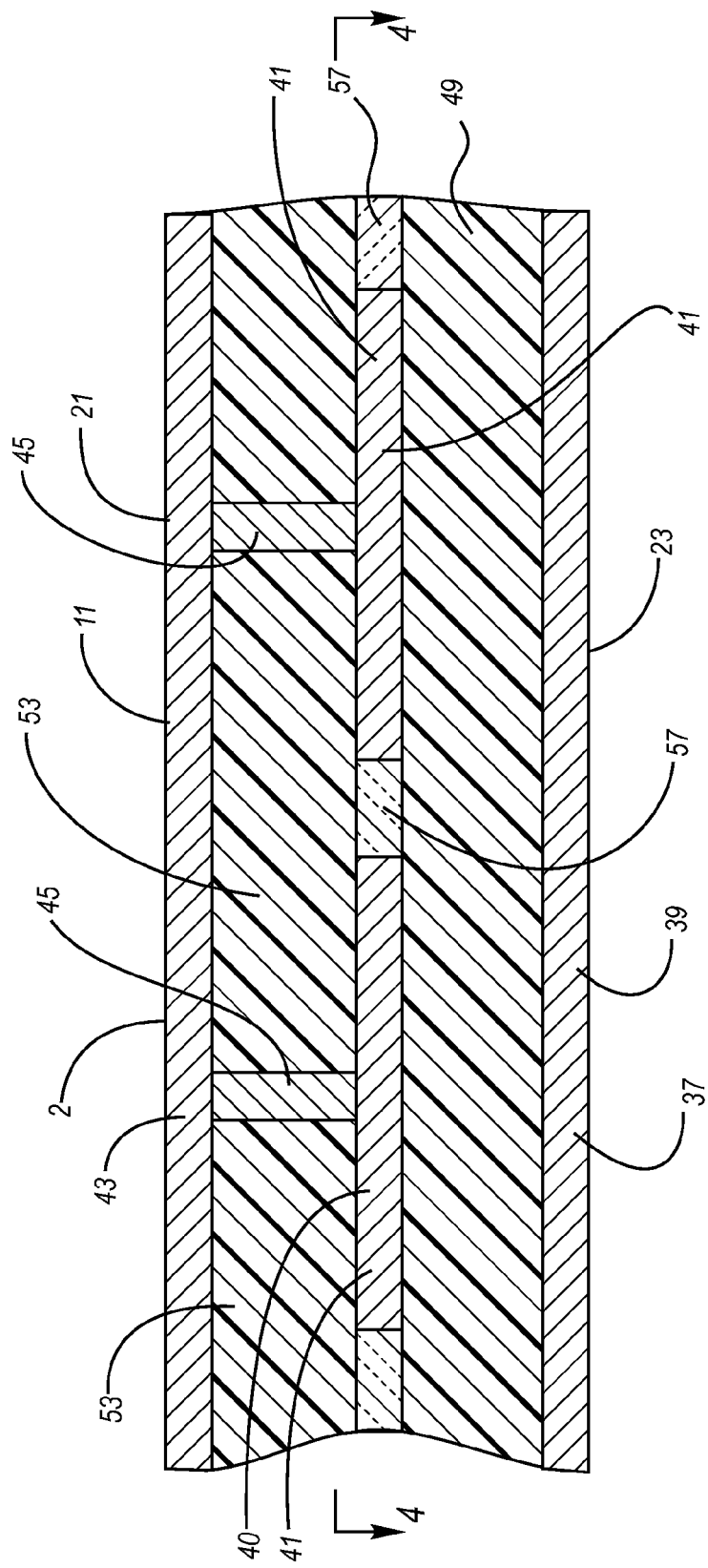
FIG. 3 is a cross section detail of the capacitor base element of the folded stack, segmented capacitor of the present invention.

Referring now also to FIG. 3, each stack layer 11 has a primary surface 23 and a secondary surface 21. In the manufacturing of the folded stack, segmented capacitor 1 of the present invention, each first stack fold 5 results in the primary surface 23 of a first stack layer 13 being placed in contact, in a primary surface contact zone 19, with the primary surface 23 of a second stack layer 15, as shown in FIG. 1. Similarly, each second stack fold 7 results in the secondary surface 21 of a second stack layer 15 being placed in contact, in a secondary surface contact zone 17, with the secondary surface 21 of a first stack layer 13.

Figure 4:
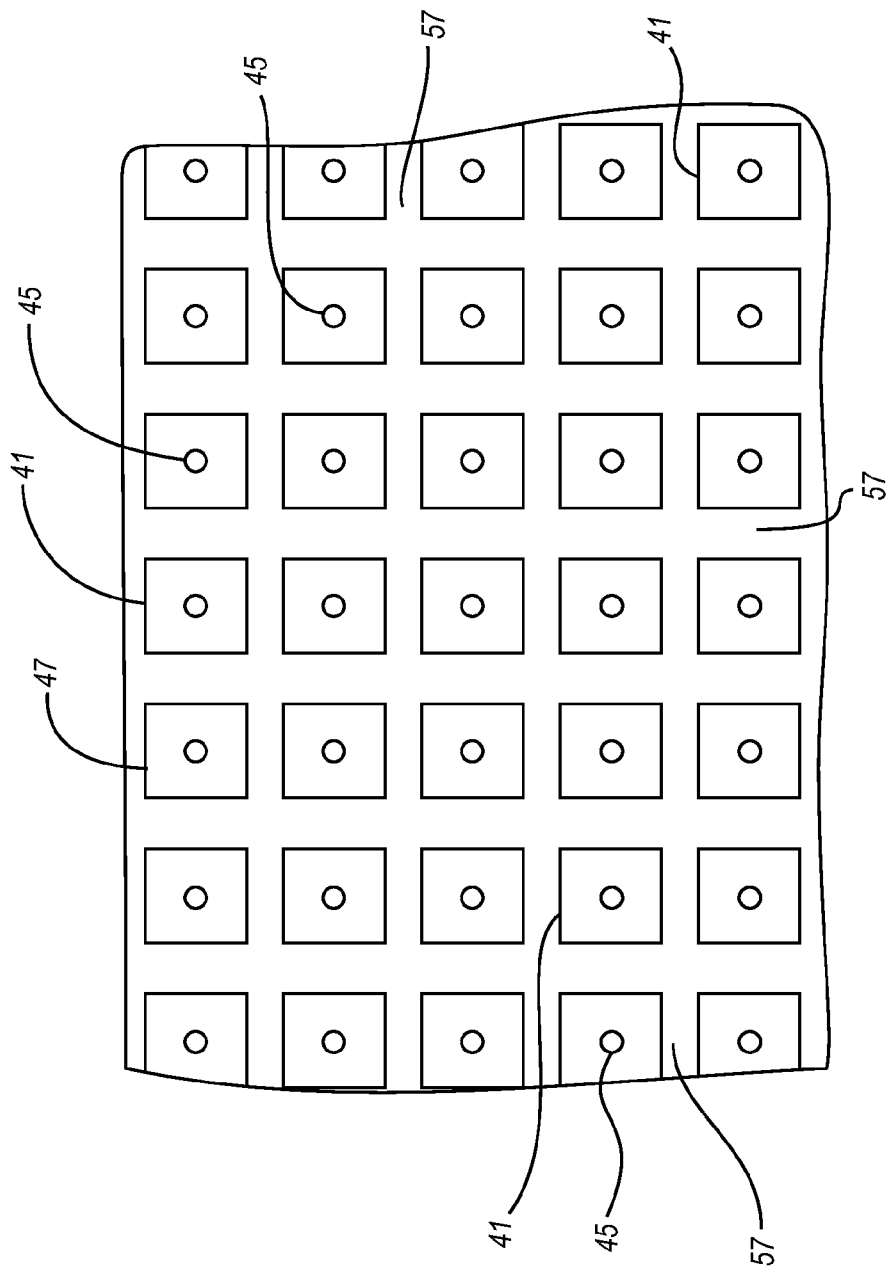
FIG. 4 is a partial plan view cross section of a secondary electrode pattern for the placement and spacing of the secondary electrode elements.

Referring again to FIG. 3 each of the stack layers 11, for the preferred embodiment shown in FIGS. 1-3, are comprised of a primary electrode 37, which for the embodiment shown, may be a continuous metallic film 39, and a segmented secondary electrode 40 comprised of a plurality of a secondary electrode elements 41, each of the secondary electrode elements 41 being electrically connected to a conductor element 43 by a fuse element 45. A preferred embodiment of a secondary electrode pattern 47 for the placement and spacing of the secondary electrode elements 41 is shown in the partial plan view cross section shown in FIG. 4. The primary electrode 37 is separated from the segmented secondary electrode 40 and the plurality of secondary electrode elements 41 by a continuous primary dielectric element 49. The secondary electrode elements 41 are separated from the conductor element 43 by a conductor insulation layer 53. The fuse elements 45 pass through the conductor insulation layer 53 from the secondary electrode elements 41 to the conductor element 43. The conductor insulation layer 53 may be comprised of the same dielectric material used for the primary dielectric element 49, or may be another type of electrically insulating material. Similarly, the secondary electrode insulation 57 between the segmented secondary electrode elements 41 may be the same dielectric material used for the primary dielectric element 49 or may be another type of insulating material.

The material preferred by the present inventor for the primary dielectric element 49, and perhaps the insulating layer and the secondary electrode insulation 57 is a flexible, ultra-thin ceramic material. The use of a flexible ceramic material for the dielectric provides for substantial increase in the maximum voltage and the maximum stored charge for the capacitor of the present invention in comparison to metalized film capacitors.

Figure 5:
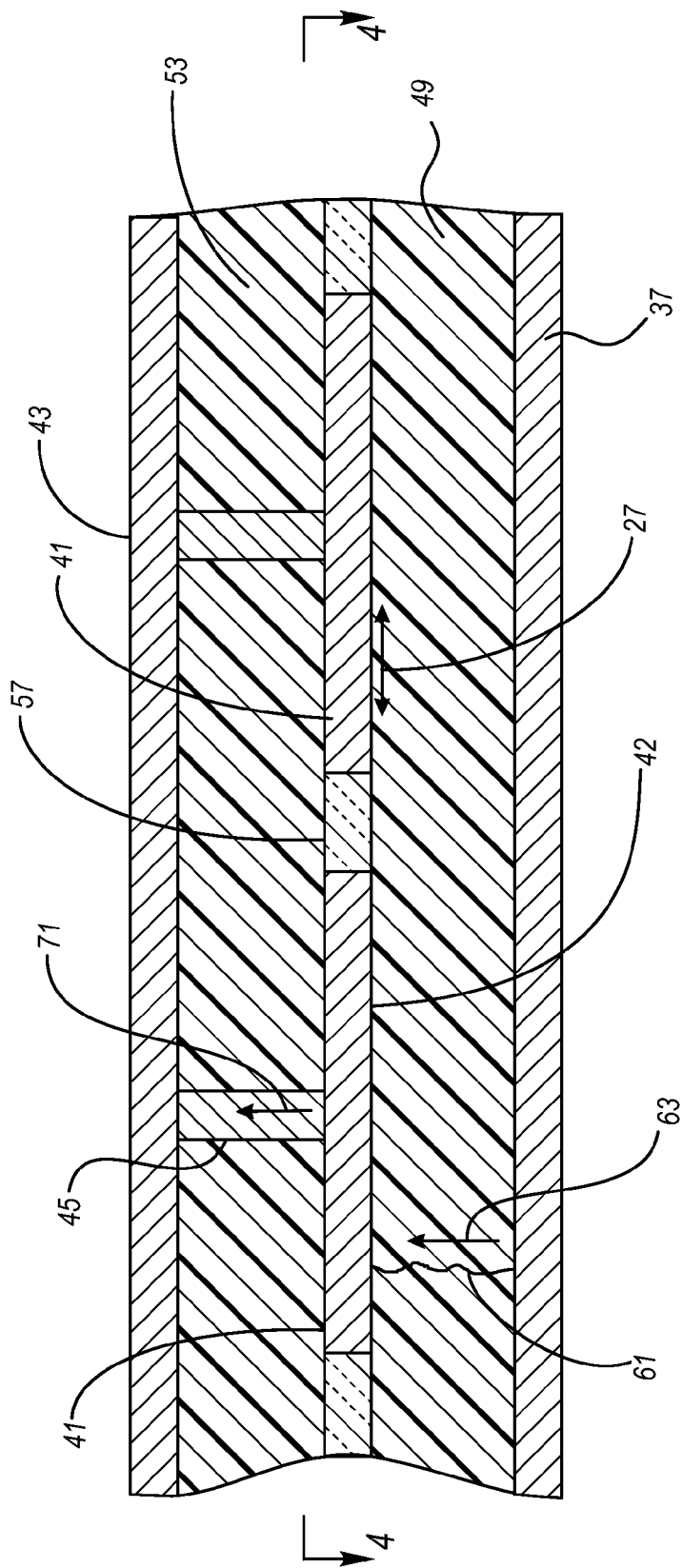
FIG. 5 is a cross section detail of the capacitor base element of the folded stack, segmented capacitor of the present invention illustrating the development of a dielectric fault in a portion of the primary dielectric element material allowing charge leakage as a fault current to flow between a primary electrode and a secondary segmented electrode.
Figure 6:
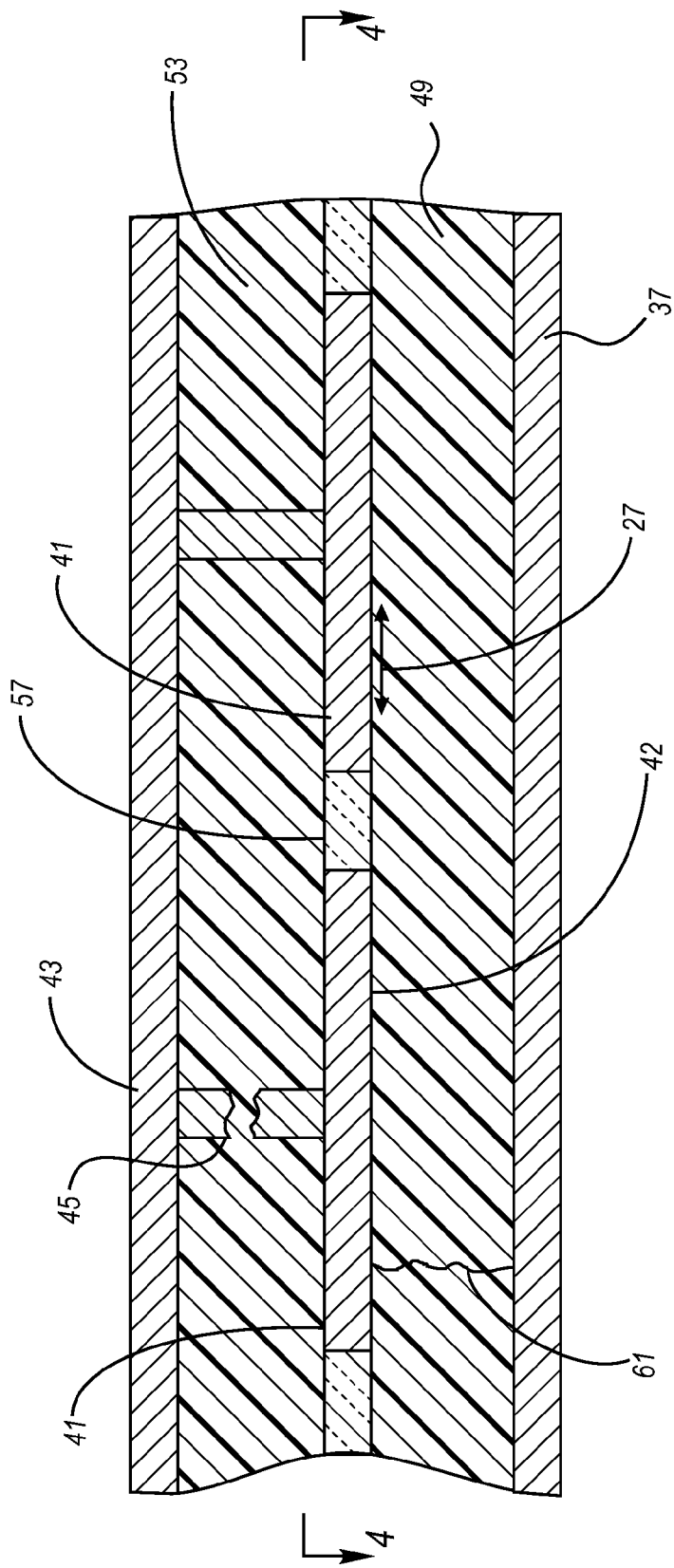
FIG. 6. is a cross section detail of the capacitor base element of the folded stack, segmented capacitor of the present invention illustrating the destruction of a fuse element by excess fuse current resulting from fault current between the primary electrode and the secondary segmented electrode.

Referring now to FIG. 5, if a dielectric fault 61, such as a crack or other type of fissure, develops in a portion of the primary dielectric element 49 material allowing charge leakage as a fault current 63 to flow between a primary electrode 37 and a secondary segmented electrode 41, the result will be an excess fuse current 71 in the fuse element 45 for the affected secondary electrode element 42, resulting in the destruction of the fuse element 45 as shown in FIG. 6. The result of the destruction of the fuse element 45 by the excess fuse current 71 is that charge leakage as fault current 63 between the primary electrode 37 and the secondary segmented electrode 41 is terminated and the folded stack capacitor 1 continues to operate with only a loss of the affected secondary segmented electrode element or elements 42. The overall failure of the capacitor is avoided.

As will be noted from FIGS. 1-3, for the embodiment of the folded stack capacitor 1 shown, for which there is an exterior capacitor insulation layer 25 but no insulation coating otherwise on the primary surface 23 of the primary electrode 37, or on the secondary surface 21 of the conductor element 43, each first stack fold 5 causes the primary electrode 37 to be folded upon itself, which results in the primary electrode 37 of contiguous stack layers 11 to be in physical and electrical contact in a primary surface contact zone 19. Similarly, each second stack fold 7 causes the conductor element 43 to be folded upon itself, which results in the conductor element 43 of contiguous stack layers 11 to be in physical and electrical contact in a secondary surface contact zone 17. The inter-layer electrical contact of the primary electrode 37 and the inter-layer electrical contact of the conductor element 43 may enhance the normal operation of the folded stack capacitor 1, by, for example, reducing current density at contact points with the first end conductor 65 and the second end conductor 67 respectively shown in FIG. 7.

Materials are selected for the primary electrode 37, the secondary electrode elements 41, the fuse elements 45, the conductor element 43, the primary dielectric element 49, the conductor insulation layer 53, and the secondary electrode insulation 57, that have adequate flexibility to allow the folding of the capacitor base element 2 without separation and breakage of the various elements. Referring to FIG. 3, because the primary electrode 37 is continuous, i.e. is not segmented, any relative electrode displacement 27 of a secondary electrode element 41 with respect to the primary electrode 37, resulting from the folding of the capacitor base element 2 will not affect the function of the secondary electrode element 41. Developing technology has led to the development of lighter, thinner, and increased conductivity materials that may be utilized for the primary electrode 37, the secondary electrode elements 41, the fuse elements 45, and the conductor element 43. Persons of ordinary skill in the art will recognize that one such material is graphene, which is a high conductivity, highly flexible, thin, and light material that may be used as a preferred material for one or more of the conductive components, including particularly the primary electrode 37, the secondary electrode elements 41, and the conductor element 43. Graphene may be disposed upon the primary dielectric element 49 to form the primary electrode 37, upon the conductor insulation layer 53 to form the secondary electrode elements 41, and upon the conductor insulation layer 53 to form the conductor element 43.

Referring also again to FIG. 5, for certain preferred embodiments, depending on the manufacturing process used, the primary electrode 37 may be deposited on or bonded to the primary dielectric element 49 and the secondary electrode elements 41 may be deposited on or otherwise bonded to the conductor insulation layer 53. To facilitate folding of the capacitor base element 2, the secondary electrode elements 41 may preferably not be bonded to the primary dielectric element 49, which may allow relative electrode displacement 27 as slippage between the secondary electrode elements 41 and the primary dielectric element 49 during folding.

Figure 7:
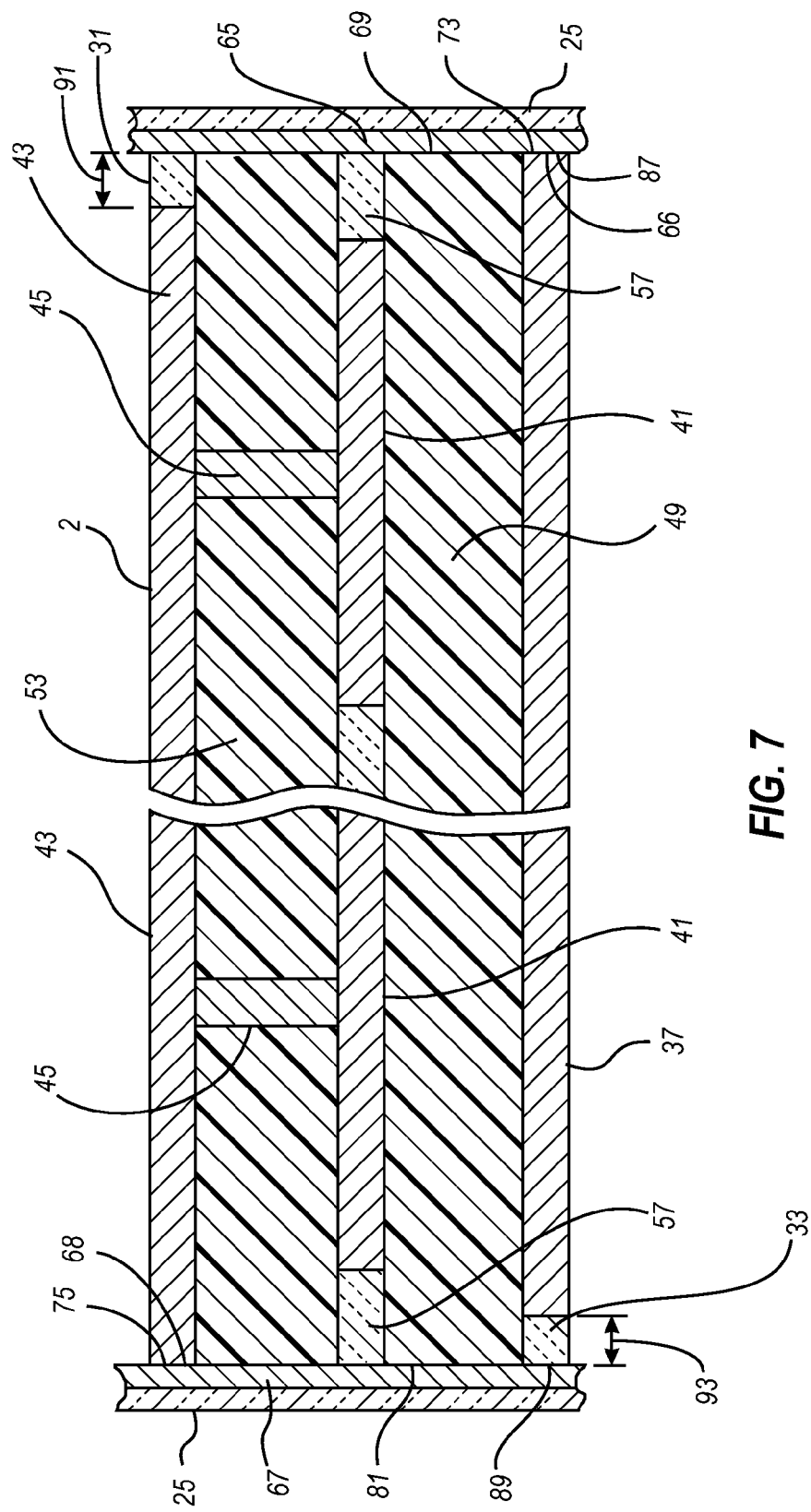
FIG. 7 is a lateral cross section detail of the capacitor base element of the folded stack, segmented capacitor of the present invention showing the first end conductor element and the second end conductor element.

Referring now to FIG. 7, a lateral cross-section of a capacitor base element 2 is shown. The primary electrode 37 extends to the first capacitor edge 87 but is retracted from the second capacitor edge 89 by an electrode retraction setback 93 which is sufficient to electrically isolate the primary electrode 37 from the second capacitor edge 89 and the second end conductor element 67. Electrode end insulation 33 may be used to further insure the electrical isolation of the primary electrode 37 from the second end conductor element 67 which is in electrical contact with the conductor element 43. The primary dielectric element 49 extends to the second capacitor edge 89 but the primary electrode 37 does not.

Referring further to FIG. 7, the conductor element 43 extends to the second capacitor edge 89 but is retracted from the first capacitor edge 87 by a conductor retraction setback 91 which is sufficient to electrically isolate the conductor element 43 from the first capacitor edge 87 and the first end conductor element 65. Conductor end insulation 31 may be used to further insure the electrical isolation of the conductor element 43 from the first end conductor element 65 which is in electrical contact with the primary electrode 37. The conductor insulation layer 53 extends to the first capacitor edge 87 but the conductor element 43 does not.

Referring further to FIG. 7, for the embodiment shown, a first end conductor element 65 is positioned on and attached to the first capacitor end 69, and is electrically connected to the first electrode edge 73 of the primary electrode 37. Similarly, a second end conductor element 67 is positioned on and attached to the second capacitor end 81, and is electrically connected to the first conductor edge 75 of the conductor element 43. The first end conductor element 65 and the second end conductor element 67 provide for current to flow to and from the primary electrode 37 and the conductor element 43 respectively, i.e. provide for charging and discharging, of the folded stack, segmented capacitor 1. Alternative embodiments of the primary electrode electrical connection 66 other than the first end conductor element 65, and an alternative embodiment of the conductor element electrical connection 68 other than the second end conductor element 67, which provide for connection of the primary electrode 37 and the conductor element 43 respectively of the folded stack, segmented capacitor 1 to a charge source and electrical load, and for the charging and discharging of the folded stack, segmented capacitor 1, will be known to persons of ordinary skill in the art in view of the disclosures of this specification and the drawings, and may provide for the elimination of the first end conductor element 65 and the second end conductor element 67. For example, a simple primary wire electrical connection to the first electrode edge 73 of the primary electrode 37 and a secondary wire electrical connection to the first conductor edge 75 of the conductor element 43, and without the extent of the electrical contacts which may be provided by the first end conductor element 65 and the second end conductor element 67 as shown in FIG. 7. The obvious advantage of the use of the first end conductor element 65 and second end conductor element 67 connected to the primary electrode 37 and the conductor element 43 respectively is that they reduce the current density at the points of inflow and discharge of the current from the primary electrode 37 and the conductor element 43 respectively, which can be important, depending upon the design of the capacitor elements.

Figure 8:
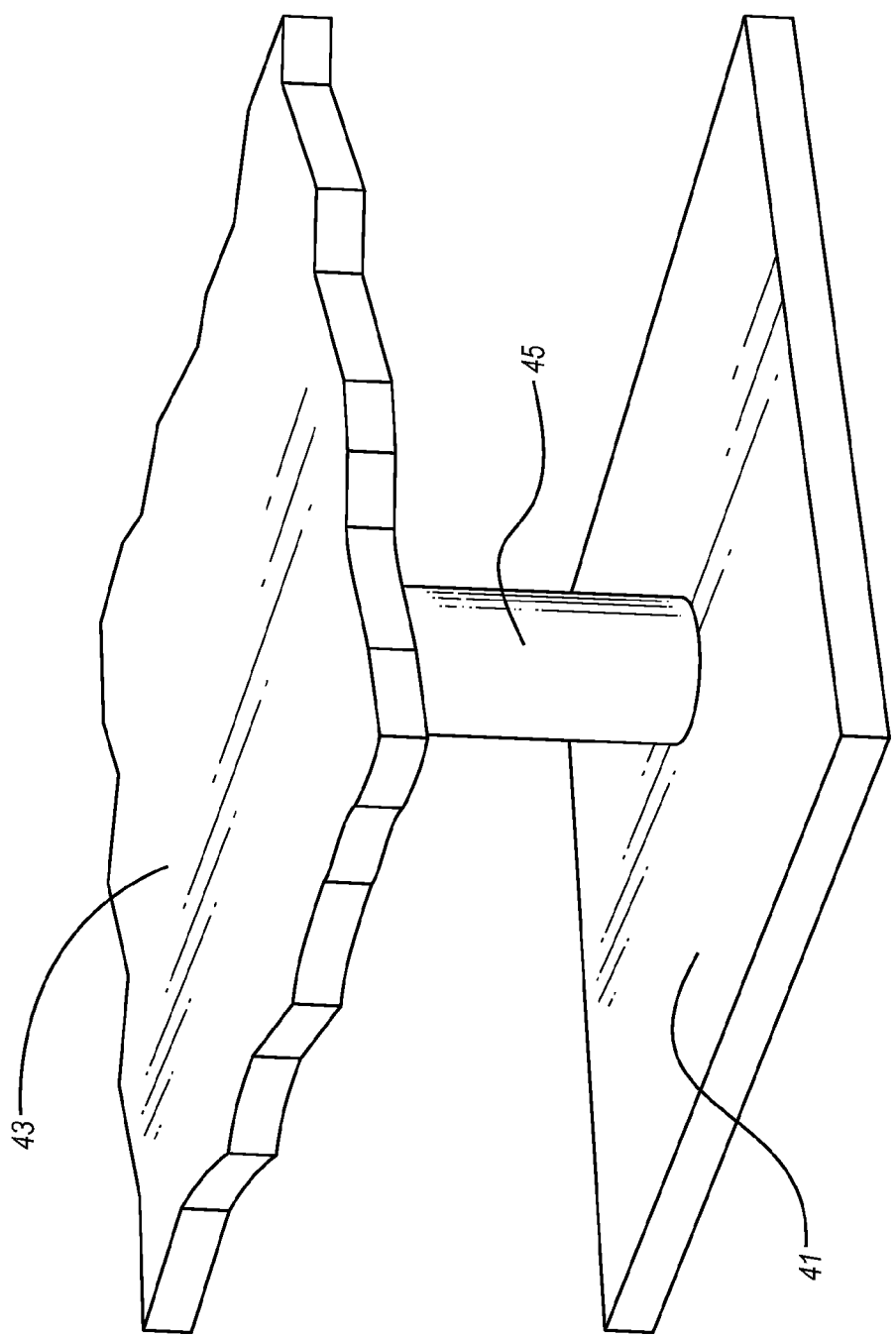
FIG. 8 is a front exploded perspective view of a secondary electrode element.

Referring now to FIG. 8, a front exploded perspective view of a secondary electrode element 41 is shown. The secondary electrode element 41 is electrically connected to the conductor element 43 by a fuse element 45. The secondary electrode elements 41, the fuse elements 45, and the conductor element 43 may be constructed from the same conductive material or may be constructed of differing conductive material.

As noted above, referring again to FIG. 5, in the event of a dielectric fault 61, such as a crack or other type of fissure, in a portion of the primary dielectric element 49 material allowing charge leakage as a fault current 63 to flow between a primary electrode 37 and a secondary segmented electrode 41, the result will be an excess fuse current 71 in the fuse element 45 for the affected secondary electrode element 42. This causes the destruction of the fuse element 45 as shown in FIG. 6. The result of the destruction of the fuse element 45 by the excess fuse current 71 is that charge leakage as fault current 63 between the primary electrode 37 and the secondary segmented electrode 41 is terminated and the folded stack capacitor 1 continues to operate with only a loss of the affected secondary segmented electrode element or elements 42.

Figure 9:
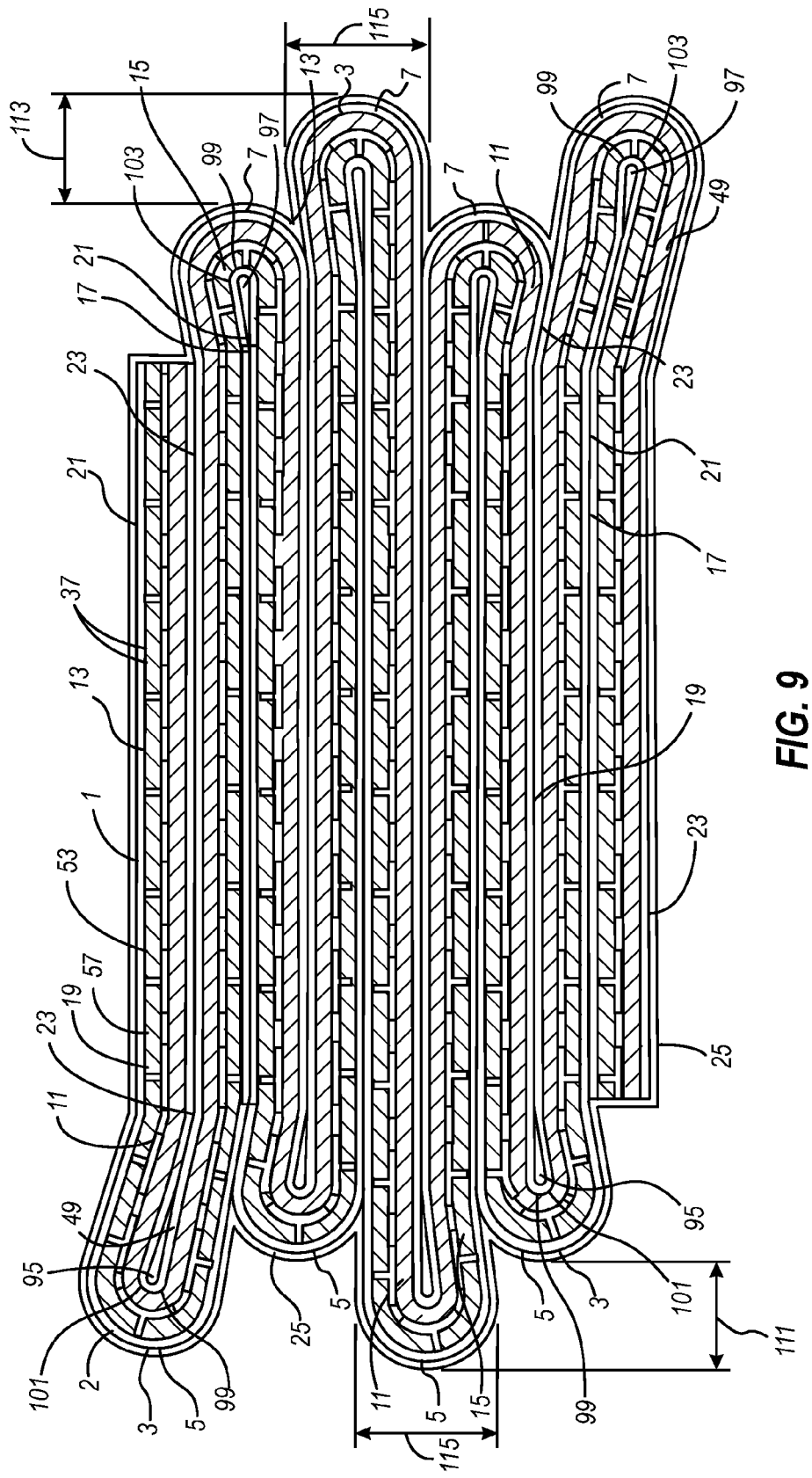
FIG. 9 is a longitudinal cross section of an alternative preferred embodiment of a folded stack, segmented capacitor of the present invention having fold wedges inserted between adjacent surfaces at each stack fold.
Figure 10:
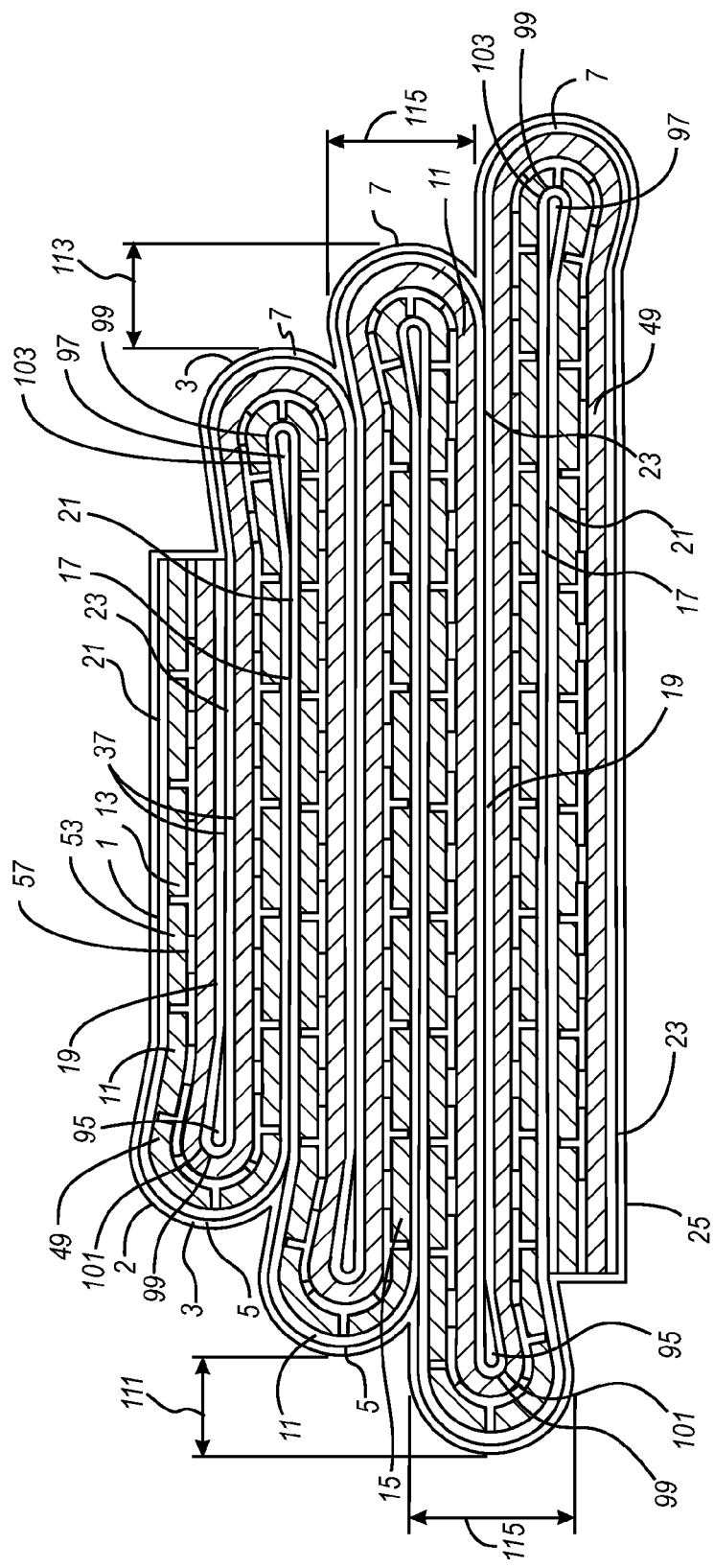
FIG. 10 is a longitudinal cross section of a further alternative preferred embodiment of a folded stack, segmented capacitor of the present invention having fold wedges inserted between adjacent surfaces at each stack fold.

Referring now to FIG. 9 and FIG. 10, alternative embodiments of the folded stack, segmented capacitor 1 of the present invention are shown. These alternative embodiments have a first fold wedge 95 inserted between adjacent primary surfaces 23 at each first inside fold 101 of the first stack folds 5, and a second fold wedge 97 inserted between adjacent secondary surfaces 21 at each second inside fold 103 of the second stack folds 7. The first fold wedges 95 and the second fold wedges 97 provide fold rounding 99 of the first inside folds 101 and the second inside folds 103, which may reduce the disruption of the electric field between the primary electrode 37 and the secondary electrode elements 41 that may result from sharp folding 105 of the first inside folds 101 and the second inside folds 103 as shown for the embodiment of the folded stack, segmented capacitor 1 in FIG. 1. FIG. 9 and FIG. 10 illustrate embodiments of the folded stack, segmented capacitor 1 with first stack fold longitudinal displacements 111 and second stack fold longitudinal displacements 113 which provide for an accommodation of the increased fold thickness 115 which results from the incorporation of the first fold wedges 95 and the second fold wedges 97. Other alternatives for accommodating the incorporation of the first fold wedges 95 and the second fold wedges 97 will be known to persons of skill in the art, in view of the disclosures of the specification and drawings submitted for this application.

In view of the disclosures of this specification and the drawings, other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:
1. A folded stack segmented capacitor comprising:
a continuous capacitor base element having a first capacitor edge and a second capacitor edge, the continuous capacitor base element comprising:
a primary electrode having a primary surface;
a segmented secondary electrode comprising a plurality of secondary electrode elements;
a primary dielectric element interposed between the primary electrode and the secondary electrode elements;
a conductor element having a secondary surface;
a conductor insulation layer interposed between the secondary electrode elements and the conductor element;
a plurality of fuse elements, each of the secondary electrode elements being electrically connected to the conductor element by a respective fuse element, each of the fuse elements passing through the conductor insulation layer;
one or more stack folds of the continuous capacitor base element, each stack fold comprising a first stack fold or a second stack fold, each first stack fold providing for the primary surface to be folded upon itself and each second stack fold providing for the secondary surface to be folded upon itself;
a primary electrode electrical connection; and
a conductor element electrical connection.

2. The folded stack segmented capacitor recited in claim 1 wherein the primary electrode electrical connection comprises a first end conductor affixed to the first capacitor edge and electrically connected to the primary electrode.

3. The folded stack segmented capacitor recited in claim 1 wherein the conductor element electrical connection comprises a second end conductor affixed to the second capacitor edge and electrically connected to the conductor element.

4. The folded stack segmented capacitor recited in claim 1 further comprising an exterior capacitor insulation layer.

5. The folded stack capacitor recited in claim 1 wherein the primary electrode is comprised of a primary metallic film bonded to the primary dielectric element.

6. The folded stack capacitor recited in claim 1 wherein one or more of the secondary electrode elements are comprised of a secondary metallic film bonded to the conductor element.

7. The folded stack capacitor recited in claim 1 wherein the primary dielectric element is a flexible ceramic layer.

8. The folded stack capacitor recited in claim 1 wherein one or more of the first stack folds have a first fold wedge inserted between adjacent primary surfaces at the first stack fold, and wherein one or more of the second stack folds have a second fold wedge inserted between adjacent secondary surfaces at the second stack fold.

9. The folded stack capacitor recited in claim 8 wherein one or more first stack fold longitudinal displacements and one or more second stack fold longitudinal displacements provide for an accommodation of the increased fold thickness resulting from the incorporation of the one or more first fold wedges and the one or more second fold wedges.

* * * * *